US008556712B2

(12) United States Patent
Thursfield et al.

(10) Patent No.: US 8,556,712 B2
(45) Date of Patent: Oct. 15, 2013

(54) SYSTEM FOR PRESENTING INTERACTIVE CONTENT

(75) Inventors: Paul Philip Thursfield, Eindhoven (NL); Lucas Jac bus Franciscus Geurts, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 2852 days.

(21) Appl. No.: 10/145,640

(22) Filed: May 15, 2002

(65) Prior Publication Data

US 2002/0199191 A1  Dec. 26, 2002

(30) Foreign Application Priority Data

May 17, 2001 (EP) .................................. 01201838
Sep. 25, 2001 (EP) .................................. 01203650

(51) Int. Cl.
*A63F 9/24* (2006.01)

(52) U.S. Cl.
USPC ................... 463/29; 463/43; 463/44; 463/47

(58) Field of Classification Search
USPC .................................................. 463/29, 42
See application file for complete search history.

(56) References Cited

U.S. PATENT DOCUMENTS

| 5,190,285 | A | * | 3/1993 | Levy et al. ...................... 463/36 |
| 5,766,077 | A | * | 6/1998 | Hongo ............................ 463/30 |
| 5,823,782 | A |   | 10/1998 | Narcus et al. .................. 434/156 |
| 5,853,327 | A |   | 12/1998 | Gilboa ............................ 463/39 |
| 5,991,693 | A | * | 11/1999 | Zalewski ....................... 701/300 |
| 6,290,565 | B1 | * | 9/2001 | Galyean, III et al. ............ 446/99 |
| 6,460,851 | B1 | * | 10/2002 | Lee et al. ....................... 273/238 |
| 6,468,162 | B1 | * | 10/2002 | Nakamura ........................ 463/43 |
| 6,554,679 | B1 | * | 4/2003 | Shackelford et al. ........... 446/268 |
| 6,597,342 | B1 | * | 7/2003 | Haruta ............................ 345/157 |
| 6,877,096 | B1 | * | 4/2005 | Chung et al. ................... 713/185 |
| 2001/0039206 | A1 | * | 11/2001 | Peppel ............................ 463/31 |
| 2004/0106457 | A1 | * | 6/2004 | Shinoda .......................... 463/47 |

FOREIGN PATENT DOCUMENTS

| GB | 2237514 A |   | 5/1991 |
| GB | 2334456 A | * | 8/1999 |
| JP | 8332282 A |   | 12/1996 |
| WO | WO9706479 |   | 2/1997 |

* cited by examiner

*Primary Examiner* — Tramar Harper

(57) ABSTRACT

The invention relates to an interactive system, comprising a presentation device for presenting interactive content. The system comprises an input device for controlling a presentation parameter of a content object of the interactive content. The system further comprises at least one token representing a content object, the system further comprising association means for associating said token with said input device, and means for selecting the content object represented by the token as the content object to be controlled by the input device in response to said association.

19 Claims, 2 Drawing Sheets

SYSTEM FOR PRESENTING INTERACTIVE CONTENT

FIELD OF THE INVENTION

The invention relates to a system for presenting interactive content. The invention further relates to a method of interacting with interactive content. The invention further relates to an input device for use in the above system.

BACKGROUND OF THE INVENTION

Storytelling and other forms of narration have always been a popular form of entertainment and education. Among the earliest forms of these are oral narration, song, written communication, theater, and printed publications.

Recently, computer games have been created that allow users to control the actions of a character situated in a virtual environment, such as a cave or a castle. A player must control his/her character to interact with other characters, negotiate obstacles, and choose a path to take within the virtual environment.

Various types of children's educational software have also been developed that allow children to interact with a storytelling environment on a computer. For example, Living-Books® has developed a type of "interactive book" that divides a story into several scenes, and after playing a short animated clip for each scene, allows a child to manipulate various elements in the scene (e.g., "point-and-click" with a mouse) to play short animations or gags. Other types of software provide children with tools to express their own feelings and emotions by creating their own stories. In addition to having entertainment value, interactive storytelling has proven to be a powerful tool for developing the language, social, and cognitive skills of young children.

However, one problem associated with such software is that children are usually required to use either a keyboard or a mouse in order to interact. Such input devices must be held in a particular way and require a certain amount of hand-eye coordination, and therefore may be very difficult to use for younger children. Furthermore, a very important part of the early cognitive development of children is dealing with their physical environment. An interface that encourages children to interact by "playing" is advantageous over the conventional keyboard and mouse interface, because it is more beneficial from an educational perspective, it is more intuitive and easy to use, and playing provides a greater motivation for children to participate in the learning process. Also, an interface that expands the play area (i.e., area in which children can interact), as well as allowing children to interact with objects they normally play with, can encourage more playful interaction.

OBJECT AND SUMMARY OF THE INVENTION

It is an object of the invention to provide an improved system and method of the type defined in the opening paragraph. To that end, the system according to the invention comprises a presentation device for presenting interactive content, comprises an input device for controlling a presentation parameter of a content object of the interactive content, comprises at least one token representing a content object, further comprises association means for associating said token with said input device, and comprises means for selecting the content object represented by the token as the content object to be controlled by the input device in response to said association.

A user of the system according to the invention is thus enabled to interact with the presented interactive content by controlling a selected content object with the input device. The content object is selected by associating controllable content objects with a physical token and subsequently associating the token with a particular input device. Each controllable content object may be associated with exactly one token, or with a plurality of tokens. Conversely, each token may be associated with exactly one controllable content object, or with a plurality of such objects. The system according to the invention may comprise multiple input devices for supporting multiple users, enabling each user to select a token for association with his input device, and thus to select a content object to be controlled. Each user may then control the respective selected objects simultaneously. The invention is particularly advantageous for a multi-user game system, where each user wants to control objects in a virtual environment, e.g. an agent, a vehicle etc. An example of such a multi-user game system is a digital media system that enables children to create a virtual story world using story elements as content objects, such as digital images, animations, sounds and video, which they can compose and control through the use of input devices.

Detection of the token by an input device may be effected by bringing the token in the vicinity of or in direct contact with the input device. The input device may comprise a receptacle for receiving a token, for facilitating the detection of that token.

The content objects can be visual objects, presented graphically on a display screen. In that case, controllable presentation parameters can be the position, orientation, size, speed etc. of the visual content object. The content objects can also be audio objects, e.g. a solo instrument in an orchestral performance. Controllable presentation parameters can then be the volume, the pitch or acoustic effect of the audio content object.

The controlled parameter may be associated with a token as well. For example, two different tokens may be used to control two different presentation parameters of the same content object. Alternatively, the controlled parameter may be selectable using dedicated controls on the input device or by means of menu selection etc. For example, once a token has been associated with an input device, a first control on the input device may be dedicated to control the position of a visual object, while a second control is used to control the size of the visual object.

In an embodiment, the presentation of a content object starts only after associating the related token with an input device of the system and ends after removing the token again. Alternatively, the content object has already been part of the presentation before the association of the token with the input device, but is not controllable at that moment and, instead, behaves in an autonomous way under control of the presentation system.

In an embodiment, the token comprises an identification of a content object which is already part of the interactive content. Detection of the token causes the identification to be transferred to the presentation device and subsequent presentation of the related content object, or a change from autonomous behavior to controllable behavior.

In an alternative embodiment, the token comprises a full description of a content object which is not yet a part of the interactive content, e.g. its visual or audible appearance and its behavior in response to all kinds of events (interaction with other content objects, its way of moving etc.). Detection of the token causes the description to be transferred to the presentation device, which is adapted to generate a presentation of the content object. This makes it possible to obtain separate tokens representing various characters which can be added to an existing interactive application.

BRIEF DESCRIPTION OF THE DRAWINGS

These and other aspects of the invention are apparent from and will be elucidated, by way of a non-limitative example, with reference to the embodiment(s) described hereinafter. In the drawings.

DESCRIPTION OF EMBODIMENTS

Figure 1:
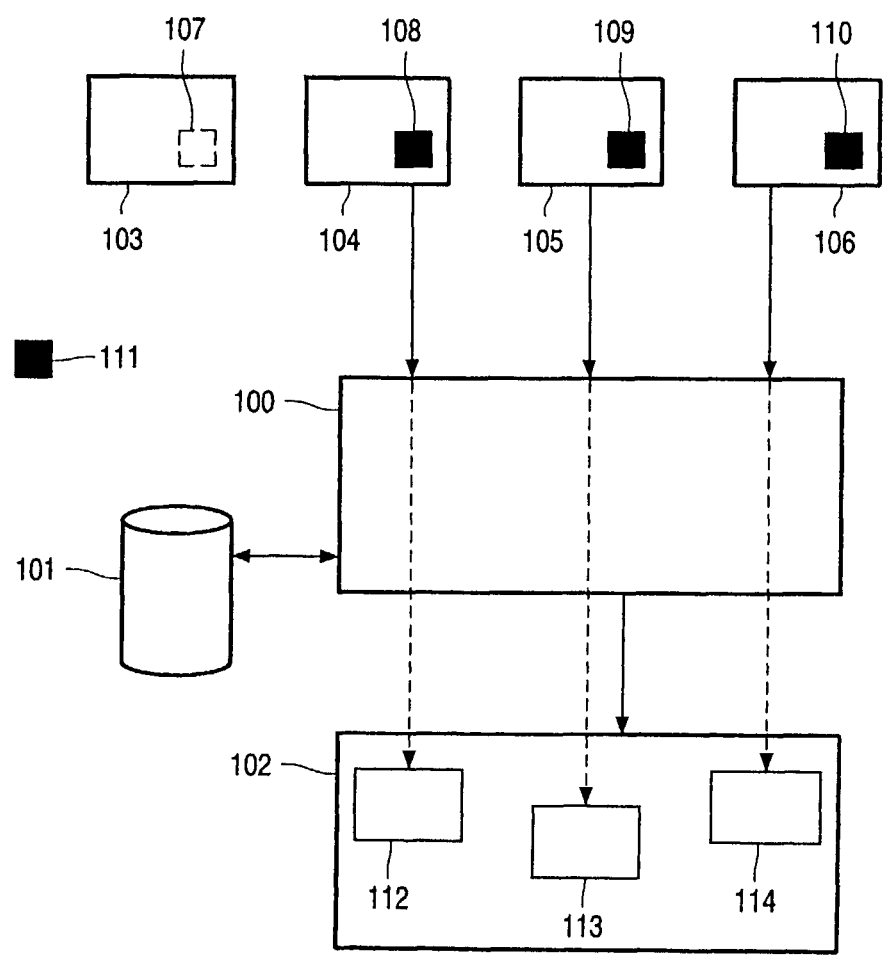
FIG. 1 shows a diagram of a virtual story world system as a system embodying the invention, FIG. 2 schematically shows an example of a screen representation of a story world.

FIG. 1 shows a diagram of a virtual story world system as a system embodying the invention. The system enables children to create a virtual story world using story elements, i.e. content objects such as digital images, animations, sounds and video, which they can compose and control through the use of active tools. The system is controlled by a central processor 100 which is capable of storing data into and retrieving data from a digital storage 101. In particular, the digital storage 101 stores content objects, background images of some interactive story application. The processor 100 is capable of making a virtual story world using the content objects from the storage 101. A representation of the virtual story world is transferred to a presentation device 102 for presentation of the story world. The presentation device 102 presents visual content objects, such as text, graphics and video objects on a display screen, preferably a projection screen. The presentation device 102 presents audio objects, such as voices and music, via a loudspeaker system. The system comprises a number of input devices 103, 104, 105, 106. These input devices enable users of the system to control various aspects of the content objects. Which object is controlled by a particular input device is determined by a token associated with that input device. The association is accomplished by inserting the token into a receptacle in the input device. In FIG. 1, input device 103 is currently not associated with any token, while token 111 is currently not associated with any input device. Token 111 could be associated with input device 103 by inserting token 111 into receptacle 107 of input device 103. Input devices 104, 105 and 106 are respectively associated with tokens 108, 109 and 110 which represent content objects 112, 113 and 114, respectively.

The representation of a content object by a token may be effected by storing an identification of the content object in a digital memory on the token. The identification can be read out by the input device which the token is associated with and transmitted to the processor 100. The processor 100 can then check whether the identified object is already presented on the presentation device 102, showing autonomous behavior. If not, the identified object is retrieved from the storage 101 and presented on the presentation device 102. Such presentation need not be immediate, but may be delayed due to the specific character of the content object. For example, if the story world currently represents a daytime image that includes the sun in the sky, and the user is to insert a moon object, the presentation may first cause the sun to set and the sky to become dark, before the moon becomes active. Once presented, the content object can be controlled by the user operating the input device which is associated with the token representing said content object. For example, the movement of the moon through the sky can be controlled by controlling its coordinate positions. Alternatively, the size or shape of the moon may be controlled using the input device. Preferably, the input device comprises a trackerball or a joystick for altering such parameters. The value of the parameter may also be determined by the location of the input device relative to the screen or relative to the other input devices. For example, the size of the moon may be increased by moving the input device closer to the projection screen 102, and decreased by moving it away from the projection screen 102. Instead of being a static housing with built-in movable parts for controlling the content objects, an input device may also be a movable object in itself, e.g. a ball which can be rolled over the floor. Such rolling can be sensed by a tilt sensor and converted in control data for controlling e.g. the movement of a content object.

Selection of the controlled parameter may be effected by means of a dedicated selector, push buttons, etc. Alternatively, the controlled parameter is determined by the token associated with the input device. In this case, not only the controlled content object, but also the controllable parameter is stored in the token and read out by the system. Yet another alternative is that each input device comprises multiple actuators for controlling different variables, e.g. a dedicated handle to control the size of a content object.

An input device may comprise a plurality of receptacles for association with multiple tokens. This enables the control of multiple content objects by means of one input device. The tokens may be of uniform shape and appearance, without perceptible identification of the represented object. For example, the tokens may all have the shape of a card or a cylinder. Consequently, associating such a token with an input device causes a surprise effect, namely which content object is controlled. Alternatively, the tokens may have visible indications referring to the controlled object. Such indications may be pictures or shapes. Also, the receptacles of the input devices may be suitable for receiving only one particular token shape, but preferably each input device is suited to be associated with any token.

In a preferred embodiment, there is a one-to-one correspondence between content objects and tokens. However, a one-to-many or a many-to-one correspondence is also possible.

If multiple tokens represent the same content object and both tokens are associated with an input device, two users may be capable of controlling the same content object simultaneously. The resulting behavior may be derived in some way from control signals from both input devices. For example, if the first user moves the content object to the left of the presented scene, while the second user moves the content object to the bottom of the presented scene, the result may be that the content object is moved to the bottom left of the presented scene.

If multiple content objects are represented by the same token, these content objects can be controlled simultaneously by means of a single input device. For example, if there are multiple animal objects being presented and they are all controlled by the same input device, the objects act as a herd of animals.

Instead of completely autonomous behavior when there is no associated token active, or fully controlled behavior if there is an associated token active, there may be some intermediate form of behavior which is partly autonomous and partly under direct control of an input device. For example, a bird is animated differently compared to a fish when it is moved using an input device. The motion of a content object can be specified by a behavior description which is stored either in the storage 101 or in the token.

Figure 2:
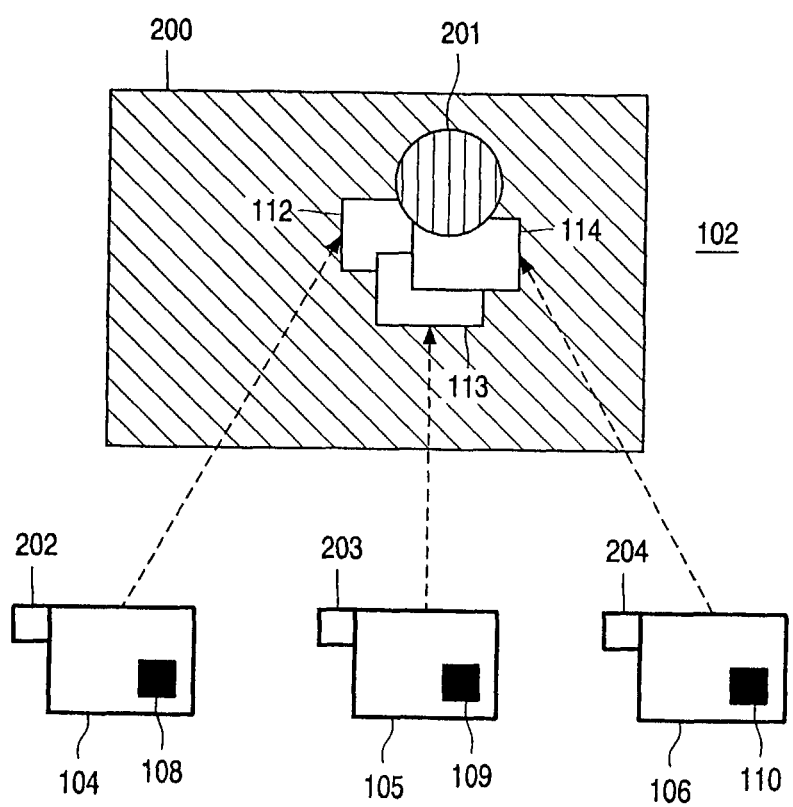

FIG. 2 schematically shows an example of a screen representation of a story world. It contains the same content objects 112, 113 and 114, which are being controlled by input devices 104, 105 and 106, respectively. It shows that each object may be located in its own layer, enabling a user to control it without hindering other objects. Preferably, all controllable objects are in layers on top of an optional background layer 200 and beneath an optional foreground layer depicted by content object 201. The background may be user selectable or generated automatically by the interactive application. Similarly, the foreground layer may be user selectable or generated automatically by the application (as a kind of ongoing story). In this embodiment a new layer is created for every newly activated content object and removed again after the content object is deactivated (by dissociating its token from the input device).

In an alternative embodiment, controlled objects and optional foreground objects may be located in the same layer, enabling them to interact with each other. Alternatively, the user may freely select the desired layer, or the layer may change in response to movement in a direction perpendicular to the screen. Putting content objects into one layer may impose all kinds of (programmable) constraints upon the objects, e.g. the option that a car object may crash against a tree object. The system may generate proper animation and sound effects for such events, whereas the user need only to control the movements leading to the crash.

The borders of the screen may also impose constraints upon the objects, for example, they can be a fixed barrier forcing objects to remain on the screen. This may apply to all objects in all layers or, for example, only for the controllable content objects, whereas foreground and background objects are allowed to freely move in and out of the picture under the control of the interactive application.

Alternatively, a content object disappearing via the left border may re-appear via the left border, continuing its motion in the same direction.

Each input device comprises a selector (202,203,204) for a user to select a presentation parameter to be controlled. Each selector is a toggle button which toggles between two modes. In a first mode, the controlled presentation parameter is the position of the object. In a second mode, the controlled presentation parameter is the size of the object. If the input device is a two-dimensional controller, e.g. a joystick or a trackerball, the size may be controlled independently for the height and width of the object. For example, pushing the joystick to the north means increasing the height of the object, whereas pushing the joystick to the west means decreasing the width of the object. Alternatively, the size is controlled in a uniform way. For example, pushing the joystick to the north or east means increasing the size in all directions, while pushing to the south or west means decreasing the size.

It will be recognized that the selector (202,203,204) can be any other means for selecting one from a plurality of modes. For example, a three-position switch may be applied if it is also desirable to control the object color.

Throughout the Figures, like reference numerals indicate like or corresponding features. Some of the features indicated in the drawings are typically implemented in software, and as such represent software entities, such as software modules or objects.

In summary, the invention relates to an interactive system, comprising a presentation device for presenting interactive content. The system comprises an input device for controlling a presentation parameter of a content object of the interactive content. The system further comprises at least one token representing a content object, further comprises association means for associating said token with said input device, and comprises means for selecting the content object represented by the token as the content object to be controlled by the input device in response to said association.

Although the invention has been described with reference to particular illustrative embodiments, variants and modifications are possible within the scope of the inventive concept. Thus, for example, the association between a token and an input device may be accomplished in various ways. Instead of a receptacle or a presence detector as described hereinbefore, the association may be established by some user operable process, such as menu selection or speech commands.

The use of the verb 'to comprise' and its conjugations does not exclude the presence of elements or steps other than those defined in a claim. In the claims, any reference signs placed in parentheses shall not be construed as limiting the claim. The invention can be implemented by means of hardware comprising several distinct elements, and by means of a suitably programmed computer. In the device claim enumerating several means, several of these means can be embodied by one and the same item of hardware.

A 'computer program' is to be understood to mean any software product stored on a computer-readable medium, such as a floppy-disk, downloadable via a network, such as the Internet, or marketable in any other manner.

The invention claimed is:

1. An interactive system, comprising:
a presentation device for presenting interactive content,
an input device for controlling a presentation parameter of a content object of the interactive content in accordance with a known behavior description of said content object,
at least one token representing a content object, the at least one token storing one of an identification and a full description of the content object in a digital memory of the token, said full description comprising at least one of visual and audio appearance of said content object and a behavior of said content object responsive to events associated with said content object,
association means for associating said token with said input device, and
means for selecting the content object represented by the token as the content object to be controlled by the input device in response to said association and transferring said full description of said content object to said presentation device, which is adapted to generate a presentation of said content object in one of a plurality of layers, wherein content objects in a same one of said plurality of layers interact with each other and content objects in different layers overlap, wherein the presentation of said content object is based on whether said content object is compatible with a current presentation, and wherein when said content object is not compatible with the current presentation, the presentation device changes the current presentation to a presentation with which said content object is compatible.

2. A system as claimed in claim 1, the content object being a visual object in video or multi-media content, said presentation parameter being the position and/or the size of a presented visual object.

3. A system as claimed in claim 1, the content object being an audible object in audio or multi-media content, said presentation parameter being the volume and/or the pitch of a presented audible object.

4. A system as claimed in claim 1, the system being adapted to start presenting the selected content object in response to said association and cease presentation of the selected object in response to an end of said association.

5. A system as claimed in claim 1, said association being effected by detecting said token within a predetermined distance from said input device.

6. A system as claimed in claim 1, said associating means comprising a receptacle for receiving said token.

7. A system as claimed in claim 1, said token comprising an identification of a content object present in the interactive content.

8. A system as claimed in claim 1, said token comprising a description of a content object not yet present in the interactive content, the system being adapted to generate a presentation of said content object based on said description.

9. A system as claimed in claim 8, said description comprising a visual appearance and/or behavior of said content object.

10. The system of claim 1, wherein the input device further comprises a reading means for reading the identification from the digital memory of the token.

11. The system of claim 1, wherein the input device further comprises on of a trackerball and a joystick.

12. An input device for use in a system for presenting interactive content, the input device controlling a presentation parameter of a content object of interactive content in accordance with a known behavior description of said content object on a presentation device with respect to a current presentation, the input device comprising association means for associating the input device with a token representing a content object, the token storing one of an identification and a full description of the content object in a digital memory of the token, said full description comprising at least one of visual and audio appearance of said content object and a behavior of said content object responsive to events associated with said content object, wherein the presentation of said content object is based on whether said content object is compatible with a current presentation, and wherein when said content object is not compatible with the current presentation, the presentation device changes the current presentation to a presentation with which said content object is compatible.

13. An input device as claimed in claim 12, said associating means comprising a receptacle for receiving said token.

14. An input device as claimed in claim 12, comprising selection means for a user to select a presentation parameter to be controlled.

15. The input device of claim 12 further comprising:
reading means for reading the identification from the digital memory of the token.

16. The input device of claim 12 further comprising:
a trackerball and a joystick.

17. A method of interacting with interactive content, comprising the steps of associating a token representing a content object with an input device, the token storing one of an identification and a full description of the content object in a digital memory of the token, said full description comprising at least one of visual and audio appearance of said content object and a behavior of said content object responsive to events associated with said content object, selecting the content object represented by the token as the content object to be controlled by the input device in response to said associating based on at least one characteristic of the content object, and controlling said content object by means of said input device in accordance with a known behavior description of said content object,
wherein the presentation of said content object is based on whether said content object is compatible with a current presentation, and wherein when said content object is not compatible with the current presentation, the presentation device changes the current presentation to a presentation with which said content object is compatible.

18. A method as claimed in claim 17, the content object being a visual object in video or multi-media content, said presentation parameter being the position and/or the size of a presented visual object.

19. A method as claimed in claim 17, the content object being an audible object in audio or multi-media content, said presentation parameter being the volume and/or the pitch of a presented audible object.

* * * * *